Nov. 14, 1933.   C. A. BICKEL   1,935,007
MACHINE TOOL
Filed March 18, 1932   4 Sheets-Sheet 1

INVENTOR
Clifford A. Bickel.
BY Faulkner & Faulkner
ATTORNEYS

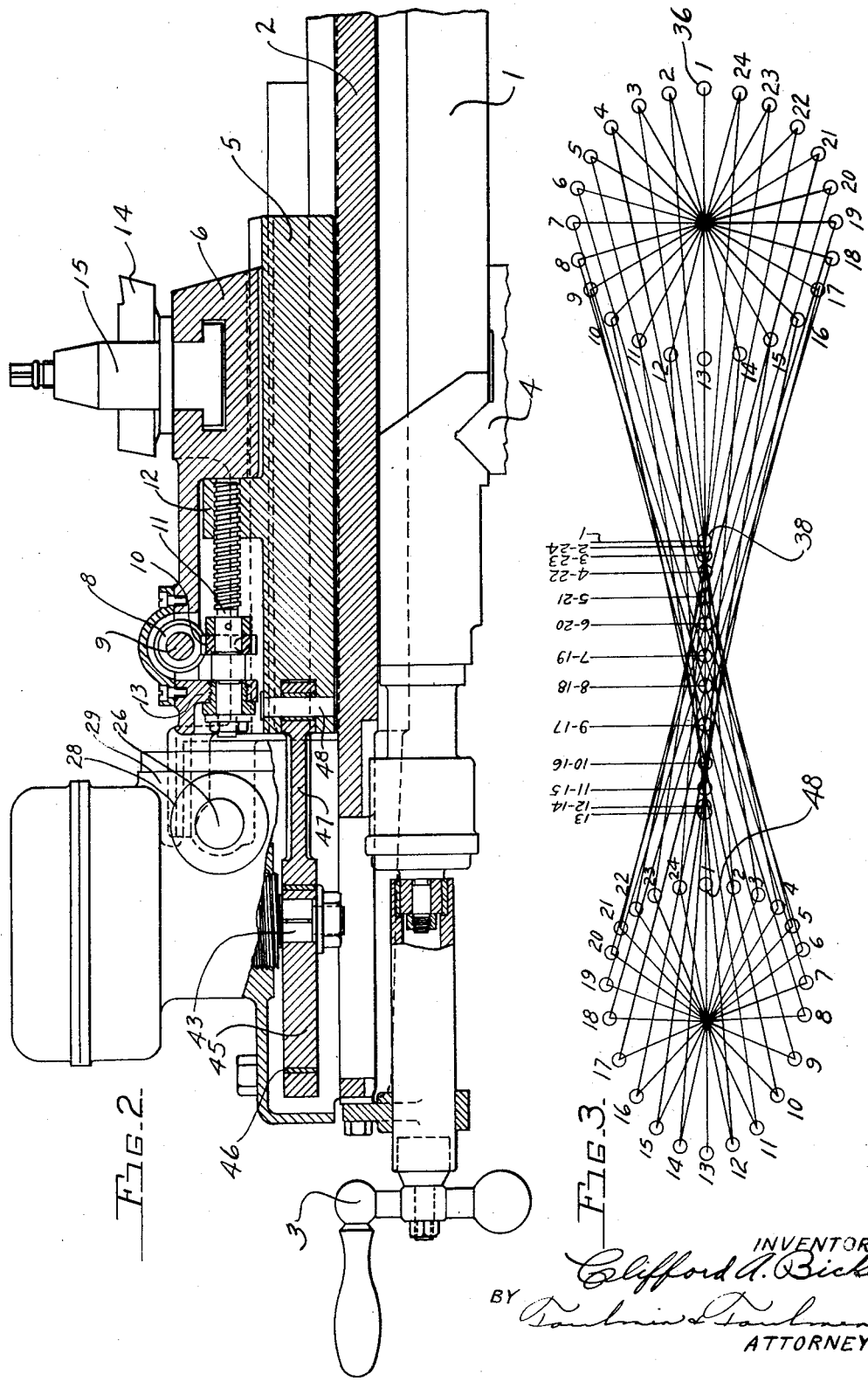

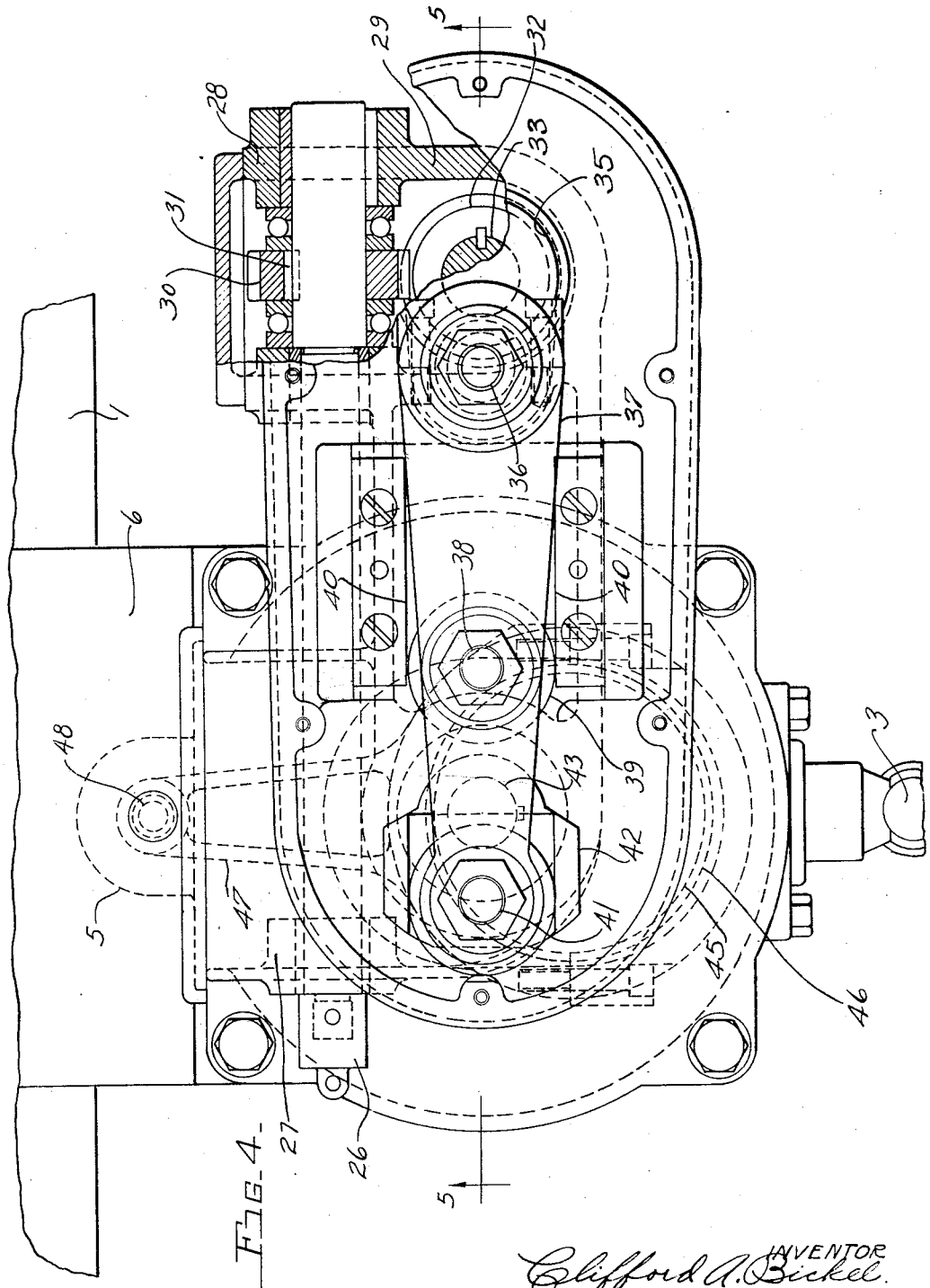

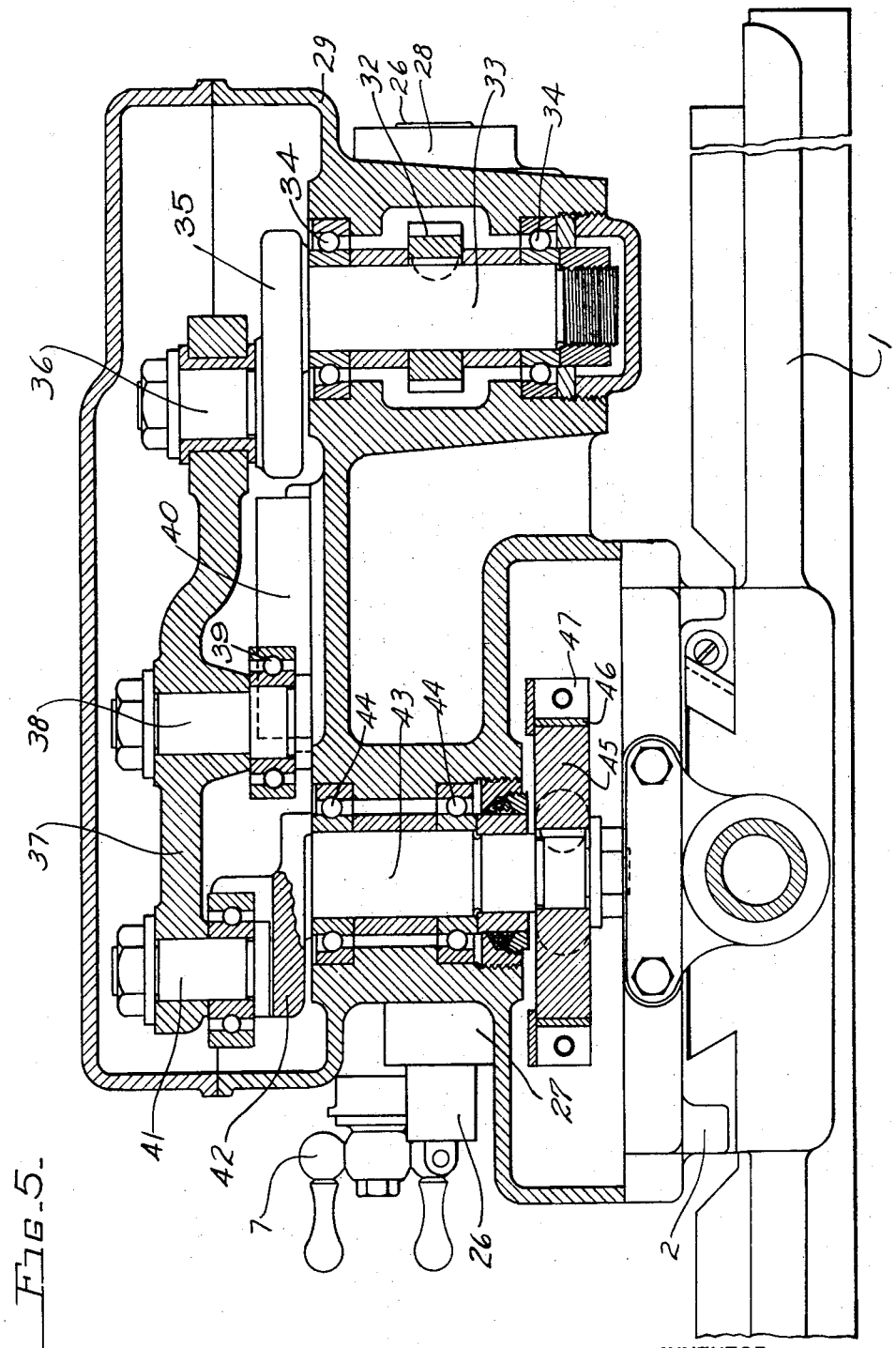

Patented Nov. 14, 1933

1,935,007

UNITED STATES PATENT OFFICE 1,935,007

MACHINE TOOL

Clifford A. Bickel, Sidney, Ohio, assignor to The Monarch Machine Tool Company, Sidney, Ohio, a corporation of Ohio Application March 18, 1932. Serial No. 599,753

7 Claims. (Cl. 82—18)

My invention relates to machine tools and, in particular, to the method of controlling the position of the cutting tool at different points in the cycle of rotation of a work piece in order to impart a different number of sides of the work piece and different configurations to the sides.

It is a particular object of my invention to provide a method and apparatus for moving the tool together with the tool slide through a given number of cycles of movement and of adjusting those cycles according to the number of inward and outward movements to be effected during a given rotation of a work piece so as to determine the number of sides and the configuration of the sides to be formed on the work piece.

This application is coordinate with my co-pending application, Serial No. 599,751 filed March 18, 1932, in which the complete machine is fully described, the present application being one form of tool reciprocating mechanism which is applicable to that machine and has, in the present instance, certain advantages according to certain types of installation on which it may be used.

Referring to the drawings:

Figure 2 is a section on the line 2—2 of Figure 1;

Figure 3 is a diagrammatic view of the several positions of the operating parts showing the line of movement and the division of the paths of movement into measured steps;

Figure 4 is a top plan view, partially in section of the tool slide reciprocating mechanism;

Figure 5 is a section on the line 5—5 of Figure 4.

Figure 1:
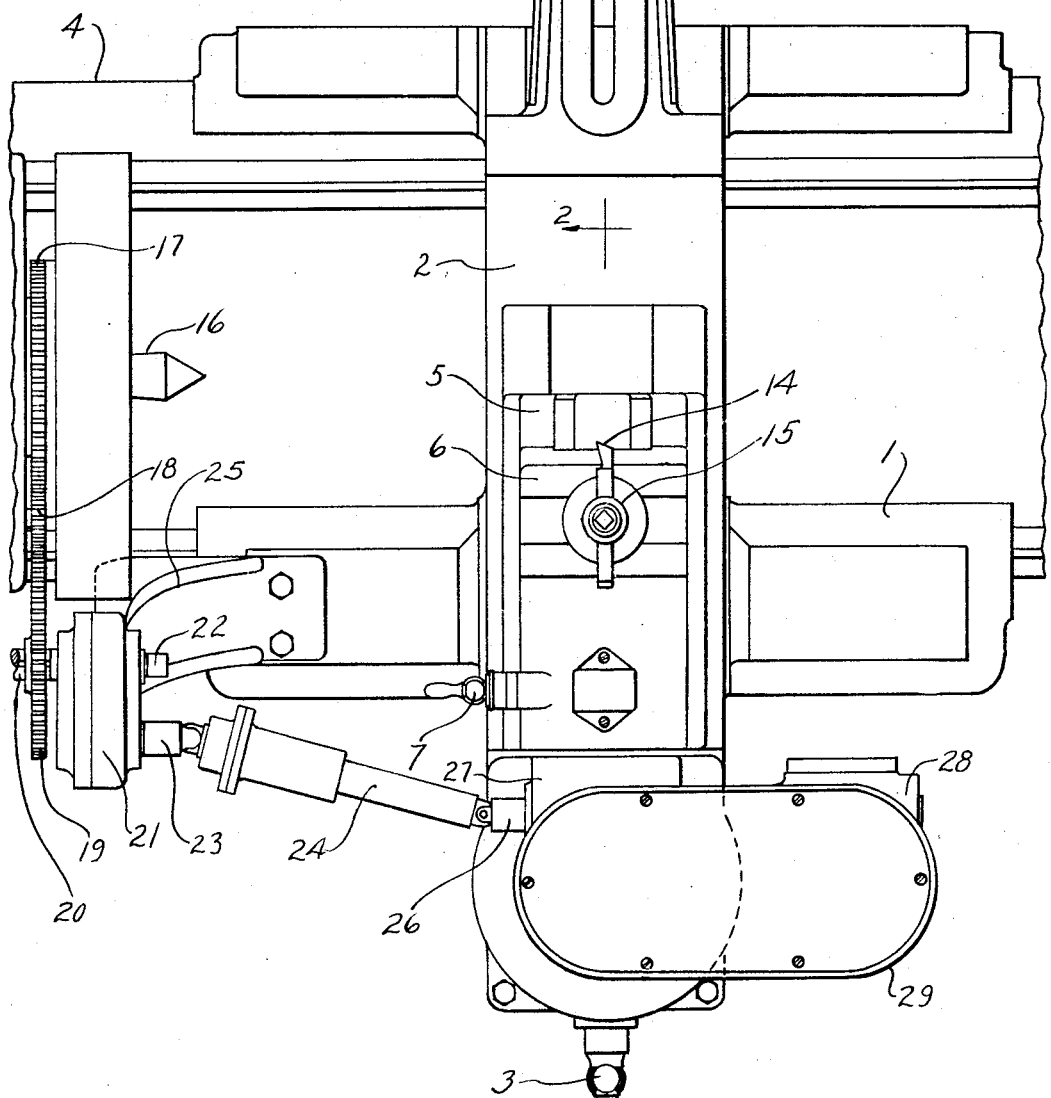
Figure 1 is a top plan view of the carriage, tool slide, tool and tool actuating mechanism.

Referring to the drawings in detail, 1 generally represents the carriage on which is mounted the cross slide 2. The relationship between the carriage and the cross slide may be adjusted by the usual hand wheel 3, the details of which are not important in the present instance. 4 indicates the bed of the tool on which the carriage moves.

Mounted upon the cross slide 2 is the intermediate slide 5 on which reciprocates the tool slide 6. The relationship between the tool slide 6 and the intermediate slide 5 is controlled by the hand wheel or lever 7 actuating the screw 8 on the screw shaft 9 which engages with the worm wheel 10 on the screw shaft 11 that is mounted in the block 12 of the intermediate slide 5 while the other end of the screw shaft is mounted within the sleeve 13 on the tool slide 6. The shaft 9 is carried in the tool slide 6. The tool 14 is carried in the tool holder 15 mounted on the tool slide 6.

The head stock spindle 16 which carries the work piece is suitably driven from a source of power, not shown, and transmits power through the gears 17, 18 and 19 to the shaft 20 which operates gears in the gear box 21 of any desired character so that either there is a direct drive to the driven member 22 or a gear drive to the driven member 23 which is connected to the link 24.

The gear box 21 is mounted upon the bracket 25 on the carriage 1. The shaft 24 drives the driven shaft 26 which is journaled at 27 and at 28 within the housing 29. A worm 30 is keyed thereto by the key 31 and meshes with a worm gear 32 on the vertical shaft 33 which is carried in the housing 29 on the bearings 34. The shaft 33 has mounted on its upper end a crank 35 and wrist pin 36 on which is mounted a pitman 37. The pitman carries near its central portion a pin 38 in a ball bearing guide block 39 which reciprocates between the parallel guideways 40 mounted on the casing 29. The free end of the pitman has mounted thereon a wrist pin 41 which has thereon a bearing block 41a reciprocating between parallel guideways 42a on the crank 42 of the vertically-disposed shaft 43 mounted in the bearings 44. On the lower end of this shaft is mounted an eccentric 45 carrying an eccentric strap 46 and pitman 47. This pitman is pivoted at 48 to the intermediate slide 5, thus imparting reciprocatory movement to the tool slide so that the continuous operation of the shaft 26 will bring about a gradual inward movement of the tool and then an outward movement, such cycle of operations taking place the number of times that there are sides to be imparted to the work piece. The length of inward movement will determine the configuration of the sides of the work piece.

It will be observed from Figure 3 that the wrist pin 36 travels in a circular path; the pin 38 travels in a straight line and the wrist pin 41 travels in an ovoid path.

It will be further noted that by the adjustment of the relationship of the slide 6 to the slide 5 the depth of tool cut can be adjusted. By the adjustment of the cross slide 2 through the hand wheel 3 the position of the entire mechanism including the tool with respect to the work can be adjusted. Therefore, the tool can be applied to the work piece at any point transversely of the work piece and automatically moved away from that point while in engagement with the work piece and back again forming a side, the number of which will depend upon the ratio of the rotation of the work piece to the number of cycles of movement of the tool and the configuration of which will depend upon the length of movement of the tool inwardly and outwardly while still engaging with the work.

With special reference to Figure 3, it will be noted that the crank movement, as indicated at the right hand side of the figure, results in a rotary movement, and is later translated into a reciprocatory movement of unequal speed during the course of the stroke of the tool actuated by the mechanism connected to the tool.

The purpose of this is to so vary the tool speed during the cycle of operations as to controlling the contour of the side of the work being cut.

It will be understood that I desire to comprehend within my invention such modifications as may be necessary to adapt it to varying conditions and uses.

Having thus fully described my invention, what I claim as new and desire to secure by Letters Patent, is:

1. In combination, a machine tool, a carriage, a tool having a rotating spindle slide moving inwardly and outwardly on said carriage, a driving shaft driven by said spindle, a crank driven thereby, a second crank, a pitman connecting said cranks and having a sliding connection with the second crank, and means to guide said pitman and means connecting said second crank to the tool slide.

2. In combination, a machine tool, a carriage, a tool having a rotating spindle slide moving inwardly and outwardly on said carriage, a driving shaft driven by said spindle, a crank driven thereby, a second crank, a pitman connecting said cranks and having a sliding connection with the second crank, and means to guide said pitman and means connecting said second crank to the tool slide, said connecting means comprising an eccentric on the second crank, an eccentric strap and a pitman.

3. In a machine tool, a rotating spindle, a carriage, a reciprocating tool carrying slide, a continuously operating driving means driven by said spindle adapted to reciprocate said tool slide comprising a pair of cranks, a connecting means therefor having a sliding connection with one crank, guiding means for the connecting means, and eccentric means on one of the cranks connected to the tool slide.

4. In a tool slide, a rotating spindle, reciprocating mechanism, a pair of spaced cranks driven by said spindle, means to rotate one of the cranks, a pitman connecting said cranks and having a sliding connection with one of said cranks, and means to pivotally support said pitman.

5. In a tool slide, a rotating spindle, reciprocating mechanism, a pair of spaced cranks driven by said spindle, means to rotate one of the cranks, a pitman connecting said cranks and having a sliding connection with one of said cranks, means to pivotally support said pitman, and means to guide the pivotal support of said pitman, said cranks and pivotal support being so arranged that the point of application of the pitman on the first crank travels in a circle, the point of support for the pitman travels in a straight line and the point of support for the other end of the pitman travels in an ovoid path.

6. In combination in a mechanism for converting rotary movement into reciprocatory movement for reciprocating a machine tool slide, a rotating spindle, a crank driven by said spindle having a crank pin travelling in a circular path, a pitman mounted at one end on said crank pin, a sliding pivotal support for said pitman, means to guide said support in a straight line, a second crank having a sliding connection with a crank pin connected to the other end of the pitman, said pivotal support being located closer to the last mentioned crank pin than to the first mentioned crank pin whereby the last mentioned crank pin will travel in an ovoid path.

7. In combination, means to support and rotate a workpiece, a continuously rotating driving shaft, a rotating spindle, a vertically-arranged crank driven by said spindle, a pitman mounted thereon, a second vertically-arranged crank slidably connected to the other end of the pitman, an intermediate slide pivoted closer to the second crank than to the first, and means to guide said pivot in a straight line, an eccentric on the second crank, an eccentric strap and pitman connected thereto and to a reciprocating tool slide, and means to adjust the position of the tool on the tool slide, whereby the reciprocation of the slide will be uniform but the point at which the tool will begin and complete its movement with respect to the work piece may be varied.

CLIFFORD A. BICKEL.